United States Patent

Ando

[15] 3,640,424

[45] Feb. 8, 1972

[54] SEALING FOR UNDERWATER CAMERA HOUSING

[72] Inventor: Sadanao Ando, Tokyo, Japan

[73] Assignee: Kabushiki Kaisha Ricoh, Tokyo, Japan

[22] Filed: Mar. 23, 1970

[21] Appl. No.: 22,073

[30] Foreign Application Priority Data

Mar. 24, 1969 Japan....................................44/26416

[52] U.S. Cl. ................................220/46 R, 277/207, 277/32
[51] Int. Cl.........................................F16j 9/00, F16k 41/00
[58] Field of Search....................277/32, 110, 207; 220/46 R

[56] References Cited

UNITED STATES PATENTS 2,600,714  6/1952  Wenscott et al.........................220/46

1,083,350  6/1914  Davis...................................220/207 X

Primary Examiner—Samuel B. Rothberg
Attorney—Burgess, Ryan and Hicks

[57] ABSTRACT

Sealing is provided for sealing both of the water and sand for underwater camera housing so as to prevent the wear and abrasion of the packing and screw threads by the sand. A packing consisting of a main body, a flange and an intermediate bridge portion therebetween, all formed integrally, is used. Watertightness is achieved mainly by the main body which is fitted in an annular groove formed around the base of an externally threaded cylindrical portion of the casing encasing therein a camera and compressed by the end face of an inwardly extending, internally threaded cylindrical portion of a cover having an optical window. Watertightness and sandtightness are achieved by the flange portion of the packing which is interposed between the end faces of the flanges of the casing and cover.

2 Claims, 3 Drawing Figures

PATENTED FEB 8 1972

3,640,424

SEALING FOR UNDERWATER CAMERA HOUSING

BACKGROUND OF THE INVENTION

The present invention relates to an underwater camera housing and more particularly sealing between the joint of a casing encasing therein a camera and a cover having an optical window for the camera.

Known is a watertight sealing method in which a cover having an optical window is tightly screwed over a casing encasing therein a camera with an O-ring fitted over the base portion of the screw-threaded portion of the casing. The O-ring is forcibly pressed by the peripheral edge of the cover, thereby achieving the watertight sealing between the casing and the cover of the underwater camera housing. But this O-ring sealing for the underwater camera housing has one distinct disadvantage. That is, the underwater cameras often come into contact with the sand very frequently when used, so that the sand tends to intrude into the housing through the space or gap between the casing and the cover and adhere to the O-ring and remain in the groove into which is fitted the O-ring When the cover is screwed upon the casing with the sand adhered to the O-ring, the latter is worn and abraised by the sand, so that the desired watertight sealing is not achieved. The sand adhered to the underwater camera housing tends to cause the wear and abrasion of the screw threads, thereby adversely affecting the snug watertight, screw thread engagement between the casing and the cover. The operator therefore must clean off the sand from the O-ring and from the screw threads by a brush every time he puts the cover over the casing. This is a very tedious work.

SUMMARY OF THE INVENTION

It is therefore the broad object of the present invention to provide an improved watertight sealing for underwater camera housing.

Another object of the present invention is to provide an improved sealing of the type described above which can effectively prevent the intrusion of the sand and the like into the underwater camera housing without adversely affecting the watertight sealing between a casing for encasing therein a camera and a cover having an optical window of an underwater camera housing.

A further object of the present invention is to provide an improved sealing of the type described above which is simple in construction and may be applied in a simple manner.

To attain these objects, the present invention provides a novel sealing for underwater camera housings of the type each consisting of a casing for encasing therein a camera and a cover having an optical window, said sealing comprising a packing made of a resilient material and consisting of an integrally formed main body, a flange and an intermediate cylindrical portion bridging the main body to the flange, said main body being fitted into an annular groove formed in the base of an externally threaded cylindrical portion extending outwardly of said casing, said main body being compressed in said annular groove by the end face of an inwardly extending and internally threaded cylindrical portion of the cover, said flange having a plurality of concentric V-shaped grooves formed in the outer surface thereof and being interposed between the end face of an annular peripheral edge of the casing and the end face of the flange of the cover, whereby upon screwing the cover over the casing, the packing can firmly watertightly seal the joint therebetween.

The sealing in accordance with the present invention can completely prevent the intrusion of sand and the like into the underwater camera housing, so that both of the packing and screw threads can be effectively prevented from being worn and abraised, whereby their durability is much improved.

Since one-piece packing is used for watertight sealing and for preventing the intrusion of the sand and the like, the handling of the packing is much facilitated and there is less chance that the packing is lost, as opposed to a two-piece packing which may be conceived for the purpose of the present invention, one for watertight sealing and the other for sand sealing.

The above and other objects, features and advantages of the present invention will become more apparent from the following description of one illustrative embodiment thereof with reference to the accompanying drawing.

DESCRIPTION OF THE PREFERRED EMBODIMENT

Figure 1:
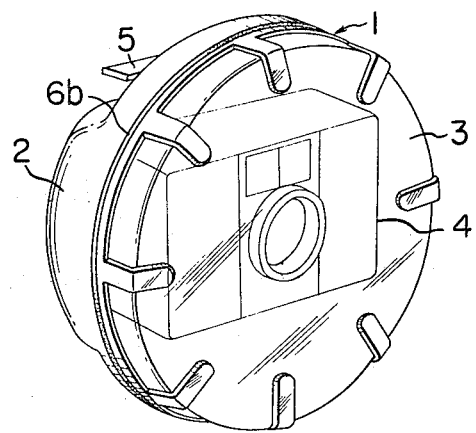
FIG. 1 is a perspective view of an underwater camera housing to which is applied the present invention in one form.
Figure 2:
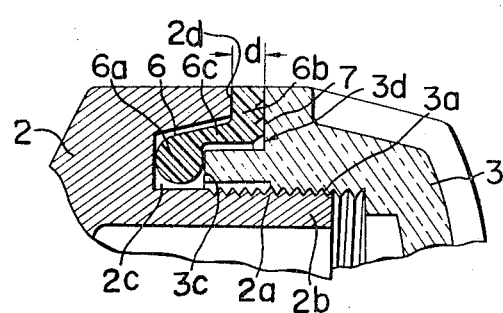
FIG. 2 is a fragmentary sectional view, on enlarged scale, of one embodiment of the present invention.
Figure 3:
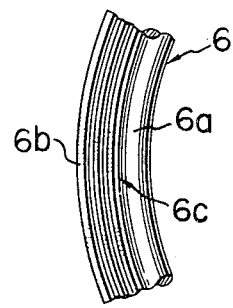
FIG. 3 is a fragmentary front view of a packing thereof.

An underwater casing or housing generally designated by reference numeral 1 generally comprises a generally cylindrical casing 2 having a bottom and a transparent cover 3 which is fitted over the casing 2. A camera 4 housed in the underwater housing 1 is of such an automatic type that a film loaded therein is advanced by one picture frame upon completion of the shutter release which can be effected by depressing a lever 5 mounted movably on the back side of the casing 2.

The transparent cover 3 has internally threaded screws 3a formed in the inner surface thereof for engagement with the externally threaded screws 2a formed around the peripheral surface of the opening of the casing 2, whereby both of the casing 2 and the transparent cover 3 may be mechanically joined together. A main body 6a of a packing generally designated by 6 is fitted into an annular groove 2c formed around the base of the externally screw-threaded portion 2b of the casing 2. The packing 6 consists of the main body 6a substantially circular in cross section, a flange 6b and a short cylindrical portion 6c bridging the main body 6a and the flange 6b. Coaxial V-shaped grooves are formed in the outer surface of the flange 6b.

When the transparent cover 3 is screwed over the casing 2, the end face 3c of the annular protrusion of the cover 3 first comes into contact with the main body 6a of the packing 6. When the cover 3 is further screwed, the end face 3c starts to be pressed against the main body 6a while the end face 3d of a stepped portion of the cover 3 next comes into contact with and presses against the flange 6b of the packing 6. It is important to select the thickness d of the flange 6b in such a manner that after the end face 3c of the cover is pressed against the main body 6a to some extent, the end surface 3d starts to press against the flange 6b as described above. When the cover 3 is further screwed or tightened, the complete watertight joint between the casing 2 and the cover 3 can be attained. It must be noted that because of the provision of the concentric V-shaped grooves 7 of the flange 6, the latter may be sufficiently compressed, when pressure is applied thereto, between end face 2d of the casing 2 and the end face 3d of the cover 3, thereby attaining the highly reliable sealing between the cover 3 and the casing 2. Thus, in addition to the watertight sealing function of the flange 6b, it serves to completely prevent the intrusion of the sand or the like into the annular groove 2c thereby preventing the adhesion of the sand or the like to the main body 6a disposed therein. The main body 6a also serves to provide the complete watertight joint between the casing 2 and the cover 3. It is therefore seen that it is not necessary to apply a strong compressive force to the flange 6b whose primary function is to prevent the intrusion of the sand or the like into the annular groove 2c as described above. When the flange 6b is so designed that it may be at least coplanar with the peripheral surfaces of the casing 2 and the cover 3 or slightly rise above these surfaces when they are joined, the sand or the like adhered to the peripheral surface of the underwater housing 1 may be readily wiped off before it is disassembled into the casing 2 and the cover 3 so that the intrusion of the sand or the like into the annular groove 2c can be positively prevented.

It is not preferable to apply the flange 6b to the joint independently of the packing main body 6a because the flange 6b, if made separately, tends to be lost during handling even though the main body 6a may be firmly held in position in the annular groove 2c. Furthermore, such a two-piece sealing member is not preferable because it means the increase in a fabrication step.

The present invention has been so far described with particular reference to one illustrative embodiment thereof, but it will be understood that variations and modifications can be effected without departing from the true spirit of the present invention as described hereinabove and as defined in the appended claim.

I claim:

1. Sealing structure for an underwater housing having a casing within which a camera is positioned and an attachable cover having a transparent area, comprising an internal annular section formed on said casing having a threaded portion engageable with a corresponding threaded portion on said cover;

an outer annular section formed on said casing and projecting in the same direction as said internal annular section and providing an annular internal groove formed therebetween, said outer annular section having a first radial wall facing said attachable cover;

an internal annular protrusion formed on said cover, said protrusion extending toward said annular groove when said casing and said cover are engaged;

a radial extension formed on said cover, said extension having an outer peripheral surface and a second radial wall connecting said outer peripheral surface with said protrusion, said outer surface being substantially in alignment with an outer surface of said outer annular section when said casing and said cover are engaged, and said second radial wall thereupon being spaced from said first radial wall;

a packing made of resilient material comprising a main body of circular form in cross section position in said annular groove and compressible by an end face of said protrusion upon tightening of said threaded portions; and said packing further comprising an annular flange member positioned to be compressed between said first and said second radial walls with an outer surface of said flange member being in alignment with said alignment of said radial extension and said outer annular section, and a bridging section connecting said flange member and said main body to be longitudinally spaced with respect to each other along an axial line extending through said casing and said cover.

2. Sealing structure according to claim 1 in which V-shaped grooves are formed on a radial surface of said flange member in contact with said second radial wall, and said main body is of a size to have compression thereof commence before the compression of said V-shaped grooves as said threaded portions are tightened.

* * * * *